(12) United States Patent
Kaskawitz et al.

(10) Patent No.: US 9,185,843 B2
(45) Date of Patent: Nov. 17, 2015

(54) VARIABLE SPEED CONTROL SYSTEMS AND METHODS FOR WALK BEHIND WORKING MACHINE

(71) Applicant: Honda Motor Co., Ltd, Tokyo (JP)

(72) Inventors: Scott Kaskawitz, Hillsborough, NC (US); Vincent Andrew Prinzo, Hillsborough, NC (US); Arvic Gutierrez Macapagal, Burlington, NC (US); Brian Bender, Mebane, NC (US)

(73) Assignee: Honda Motor Co., Ltd., Tokyo (JP)

( * ) Notice: Subject to any disclaimer, the term of this patent is extended or adjusted under 35 U.S.C. 154(b) by 34 days.

(21) Appl. No.: 14/081,875

(22) Filed: Nov. 15, 2013

(65) Prior Publication Data

US 2015/0135670 A1      May 21, 2015

(51) Int. Cl.
  *B62D 51/04*     (2006.01)
  *A01D 34/68*    (2006.01)

(52) U.S. Cl.
  CPC .... *A01D 34/6806* (2013.01); *A01D 2034/6843* (2013.01)

(58) Field of Classification Search
  USPC .............. 180/19.1, 19.3; 74/501.6, 502.2; 56/10.8, 14.7, 16.7, 10.9, 11.3, 11.8, 56/10.5
  See application file for complete search history.

(56) References Cited

U.S. PATENT DOCUMENTS

| | | | |
|---|---|---|---|
| 3,743,313 A | 7/1973 | Koch | |
| 4,930,369 A * | 6/1990 | Barnard et al. | 74/480 R |
| 4,995,227 A | 2/1991 | Foster | |
| 5,085,043 A * | 2/1992 | Hess et al. | 56/10.5 |
| 5,375,674 A | 12/1994 | Peter | |
| 5,513,543 A | 5/1996 | Carlson | |
| 5,601,512 A | 2/1997 | Scag | |
| 5,701,967 A * | 12/1997 | Barnard | 180/19.3 |
| 5,735,064 A | 4/1998 | Holl | |
| 5,784,868 A | 7/1998 | Wadzinski | |
| 5,803,847 A | 9/1998 | Kamm | |
| 6,070,690 A | 6/2000 | Eavenson | |
| 6,082,083 A | 7/2000 | Stalpes | |
| 6,098,492 A | 8/2000 | Juchniewicz | |
| 6,161,637 A | 12/2000 | Decker | |
| RE37,728 E | 6/2002 | Kamm | |
| 6,557,331 B2 | 5/2003 | Busboom | |

(Continued)

FOREIGN PATENT DOCUMENTS

EP      0 923 686      6/1999
EP      1 083 782      3/2001

(Continued)

*Primary Examiner* — Toan To
(74) *Attorney, Agent, or Firm* — Jenkins, Wilson, Taylor & Hunt, P.A.

(57) ABSTRACT

Variable speed control systems and methods for walk-behind working machines, such as lawnmowers and similar powered machines, can include a control system base, a handle having a recess formed in an edge thereof, a control lever including a lever arm that is pivotably attached to the control system base and includes a grip portion, and a control connector connected between the control lever and a machine component. The control lever can be selectively pivotable with respect to the control system base between a first angular position at which the grip portion of the control lever is spaced apart from the handle to control the machine component to be in a first operating state and a second angular position at which at least a portion of the grip portion is positioned within the recess of the handle to control the machine component to be in a second operating state.

19 Claims, 4 Drawing Sheets

(56) References Cited

U.S. PATENT DOCUMENTS

| | | | |
|---|---|---|---|
| 6,640,526 B2 * | 11/2003 | Velke et al. | 56/10.8 |
| 6,644,002 B2 | 11/2003 | Trefz | |
| 6,668,529 B2 | 12/2003 | Busboom | |
| 6,951,092 B2 | 10/2005 | Busboom | |
| 7,032,333 B2 * | 4/2006 | Friberg et al. | 37/260 |
| 7,178,322 B2 | 2/2007 | Osborne | |
| 7,194,827 B2 * | 3/2007 | Mercer et al. | 37/260 |
| 7,263,818 B2 | 9/2007 | Osborne | |
| 7,293,397 B2 | 11/2007 | Osborne | |
| 7,318,309 B2 | 1/2008 | Osborne | |
| 7,520,112 B2 | 4/2009 | Osborne | |
| 7,523,600 B2 | 4/2009 | Sasaoka | |
| 7,540,131 B2 | 6/2009 | Stover | |
| 7,543,429 B2 | 6/2009 | Kaskawitz | |
| 7,591,126 B2 * | 9/2009 | Cox | 56/10.8 |
| 7,624,521 B2 * | 12/2009 | White et al. | 37/260 |
| 7,644,781 B2 | 1/2010 | Moriyama | |
| 7,647,754 B2 * | 1/2010 | Velke et al. | 56/10.8 |
| 7,762,049 B2 | 7/2010 | Eaton | |
| 7,850,555 B2 | 12/2010 | Keane | |
| 8,312,946 B2 | 11/2012 | Lahey | |
| 8,572,940 B2 * | 11/2013 | Schmidt et al. | 56/11.1 |
| 8,925,293 B2 * | 1/2015 | Mikula et al. | 56/16.7 |
| 2002/0019277 A1 | 2/2002 | Kaesgen | |
| 2003/0000190 A1 | 1/2003 | Busboom | |
| 2003/0000192 A1 | 1/2003 | Busboom | |
| 2003/0192295 A1 | 10/2003 | Busboom | |
| 2005/0279066 A1 | 12/2005 | Osborne | |
| 2006/0021313 A1 | 2/2006 | Keane | |
| 2006/0053763 A1 | 3/2006 | Stover | |
| 2006/0218887 A1 | 10/2006 | Osborne | |
| 2007/0114076 A1 | 5/2007 | Osborne | |
| 2007/0130899 A1 | 6/2007 | Osborne | |
| 2007/0271892 A1 | 11/2007 | Sasaoka | |
| 2008/0047246 A1 * | 2/2008 | Osborne | 56/10.8 |
| 2011/0000175 A1 | 1/2011 | Lahey | |
| 2011/0108335 A1 | 5/2011 | Levander | |
| 2012/0216375 A1 | 8/2012 | Druhl | |
| 2013/0081500 A1 | 4/2013 | Helin | |

FOREIGN PATENT DOCUMENTS

| | | |
|---|---|---|
| EP | 1 859 667 | 11/2007 |
| EP | 1 053 517 | 11/2010 |
| WO | WO 98/10205 | 3/1998 |
| WO | WO 99/40499 | 8/1999 |
| WO | WO 99/63802 | 12/1999 |

* cited by examiner

VARIABLE SPEED CONTROL SYSTEMS AND METHODS FOR WALK BEHIND WORKING MACHINE

TECHNICAL FIELD

The subject matter disclosed herein relates generally to variable control systems for powered equipment. More particularly, the subject matter disclosed herein relates to variable speed controls and methods for walk-behind working machines, such as lawnmowers.

BACKGROUND

Many walk behind working machines, such as lawnmowers and other similar small powered equipment, have a self-propel system that propels or drives the working machine at a selected ground speed. In such systems, a control system is typically carried on the handle to allow the operator to engage and disengage the self-propel system and to select a desired ground speed. For example, many such control systems use a pivotable ground speed control bail on the handle of the working machine. In such systems, the bail can be pivoted to engage the self-propel system, with the degree of movement of the ground speed control bail dictating the ground speed of the working machine.

In these conventional self-propel systems, however, it can be difficult to maintain the control system in a fixed position corresponding to a desired cruising speed. For example, many control systems lack a fixed position in which the operator can comfortably hold the control bail while operating the working machine at a self-propelled "cruising" speed. In addition, with slipping belt or variable speed type transmissions that are commonly used in many lawnmowers, for example, the driving torque can change depending on the ground conditions such as the slope or ground surface. In such changing conditions, the speed of the transmission may require varying the control in a substantially continual manner to achieve a consistent desired speed.

In view of these issues, it would be desirable for a ground speed control system to allow for comfortable operation of the working machine at a cruising speed while still enabling changes in the driving torque to account for changing ground conditions.

SUMMARY

In accordance with this disclosure, variable speed control systems and methods for walk-behind working machines, such as lawnmowers and similar powered machines, are provided. In one aspect, a variable speed control system for a walk-behind working machine is provided. The system can comprise a control system base, a handle having a recess being formed in an edge of the handle, a control lever comprising a lever arm having a first end that is pivotably attached to the control system base and a second end substantially opposing the first end that comprises a grip portion, and a control connector connected between the control lever and a machine component. The control lever can be selectively pivotable with respect to the control system base between a first angular position at which the grip portion of the control lever is spaced apart from the handle and a second angular position at which at least a portion of the grip portion is positioned within the recess of the handle. In this arrangement, the control connector can be configured to control the machine component to be in a first operating state when the control lever is in the first angular position and to be in a second operating state when the control lever is in the second angular position.

In another aspect, a variable speed control system for a walk-behind working machine can comprise a control system base, a handle having a recess disposed or formed in an edge of the handle, a control lever comprising a lever arm having a first end that is pivotably attached to the control system base and a second end substantially opposing the first end that comprises a grip portion, and a control connector connected between the control lever and a machine component. The control lever can be selectively pivotable with respect to the control system base among a first angular position at which the grip portion of the control lever is spaced apart from the handle and a second angular position at which an outer surface of the grip portion of the control lever is substantially flush with an outer surface of the handle, and the control connector can be configured to control the machine component to be in a relatively low-speed operating state when the control lever is in the first angular position and to be in a relatively high-speed operating state when the control lever is in the second angular position.

In yet another aspect, a method for varying a speed of a walk-behind working machine is provided. The method can comprise pivoting a control lever with respect to a control system base between a first angular position at which a grip portion of the control lever is spaced apart from a handle and a second angular position at which at least a portion of the grip portion is positioned within a recess formed in an edge of the handle. In this way, pivoting the control lever to the first angular position controls a machine component to be in a first operating state, whereas pivoting the control lever to the second angular position controls a machine component to be in a second operating state.

Although some of the aspects of the subject matter disclosed herein have been stated hereinabove, and which are achieved in whole or in part by the presently disclosed subject matter, other aspects will become evident as the description proceeds when taken in connection with the accompanying drawings as described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 1b is a sectional side view of a portion of a handle of the variable speed control system shown in FIG. 1a;

FIG. 2b is a sectional side view of a portion of a handle of the variable speed control system shown in FIG. 2a;

FIG. 3b is a sectional side view of a portion of a handle of the variable speed control system shown in FIG. 3a.

DETAILED DESCRIPTION

The present subject matter provides variable speed control systems and methods for walk-behind working machines, such as lawnmowers and similar powered machines. In one aspect, the present subject matter provides variable speed control systems and methods that can vary speed, comfortably hold a fixed speed, and maintain speed through changing torque requirements.

Figure 1A:
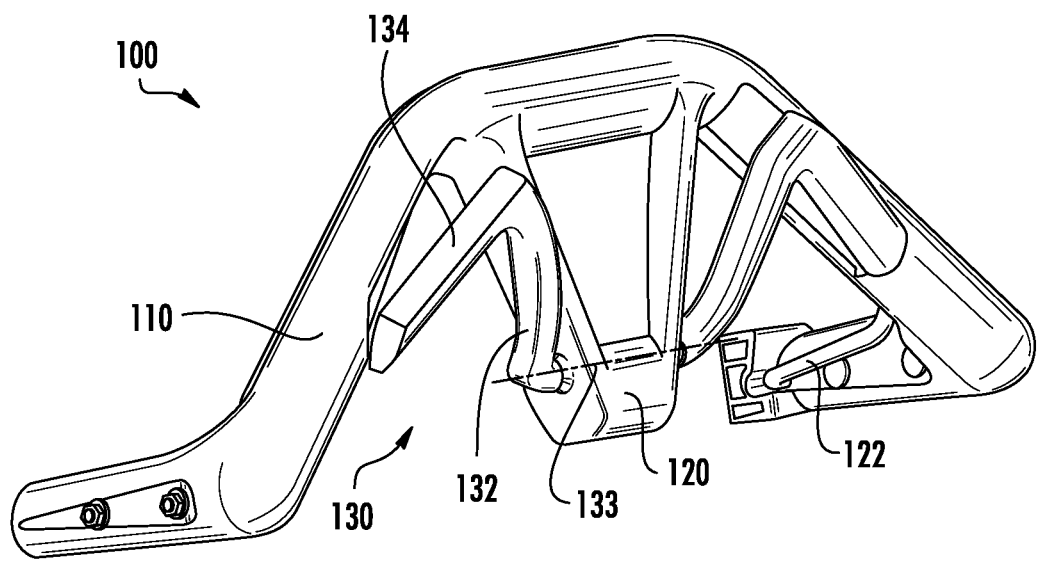
FIG. 1a is a perspective view of a variable speed control system in a first operating position according to an embodiment of the presently disclosed subject matter.
Figure 1B:
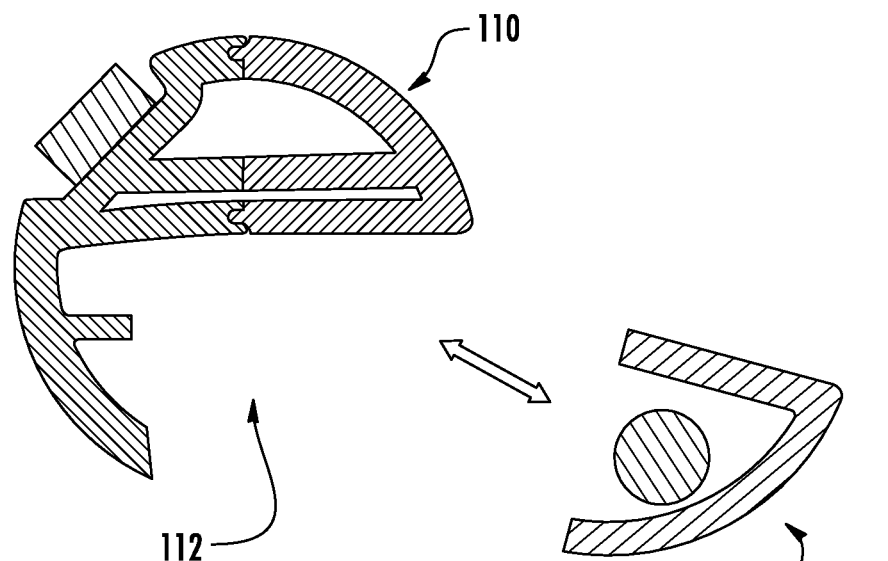
Figure 2A:
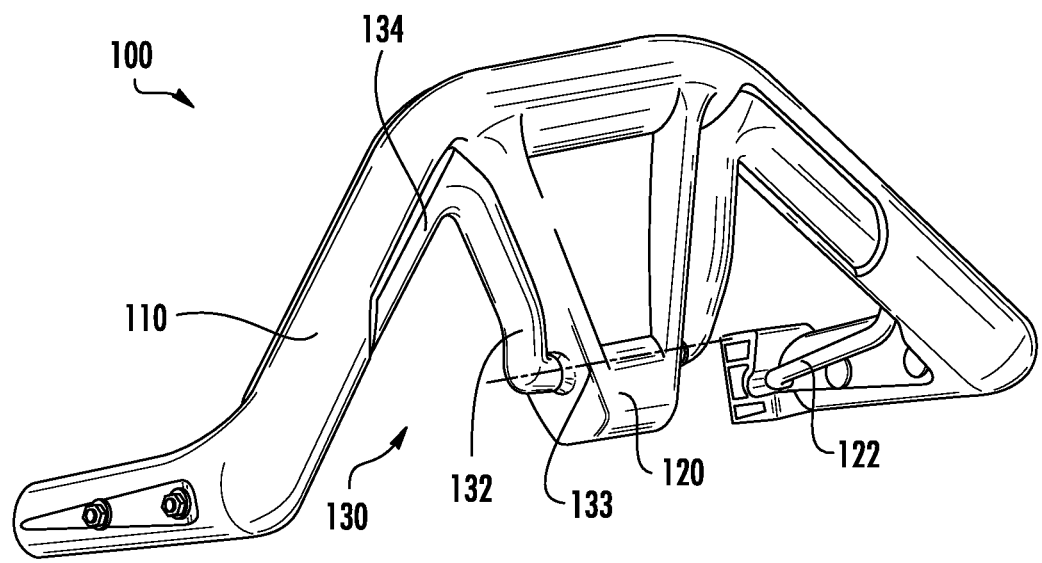
FIG. 2a is a perspective view of a variable speed control system in a second operating position according to an embodiment of the presently disclosed subject matter.
Figure 2B:
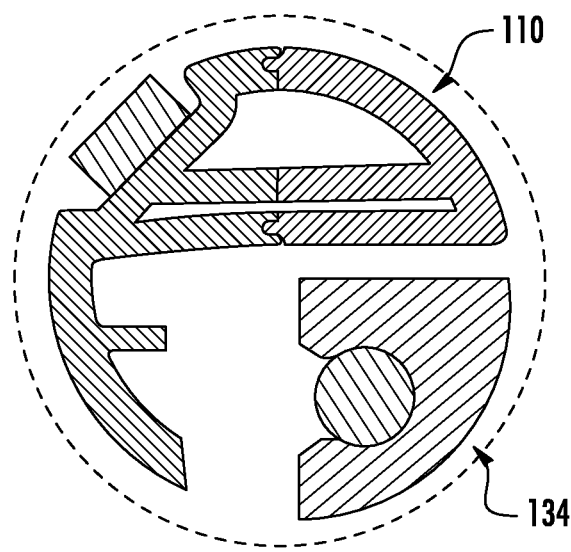
Figure 3A:
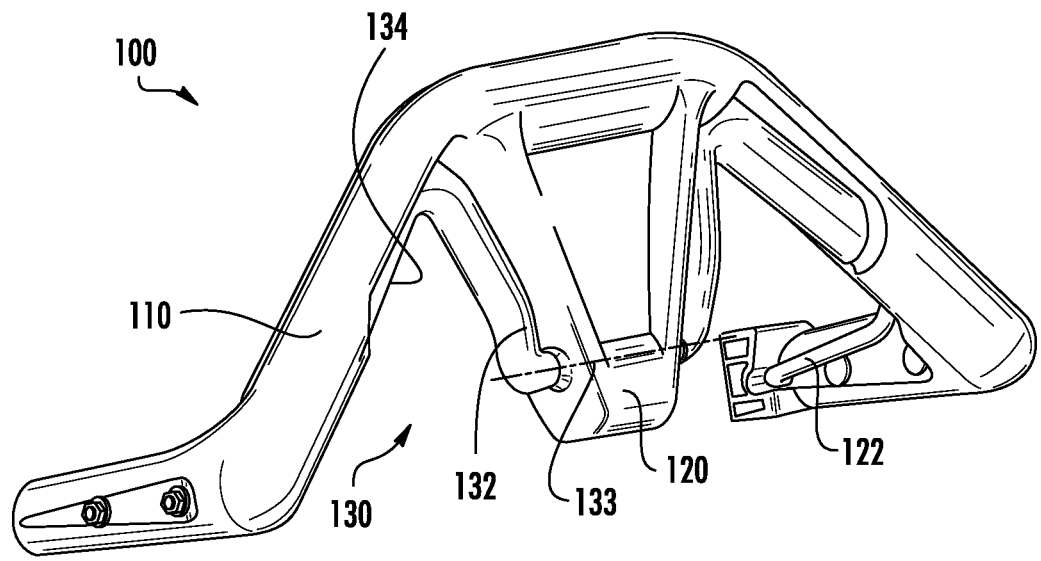
FIG. 3a is a perspective view of a variable speed control system in a third operating position according to an embodiment of the presently disclosed subject matter.
Figure 3B:
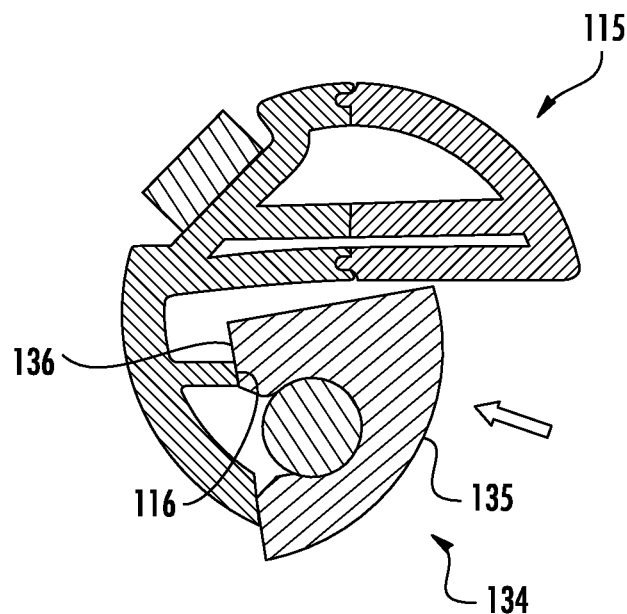
Figure 4:
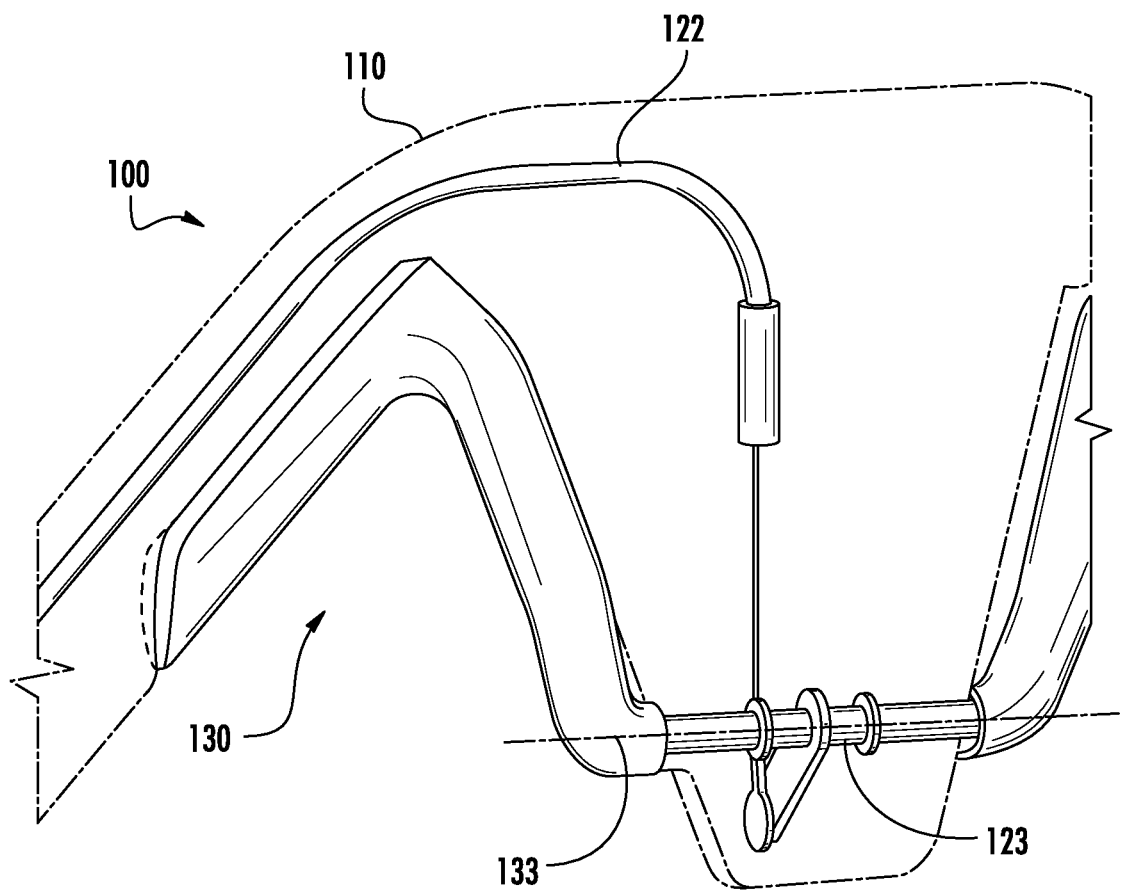
FIG. 4 is a front view of a variable speed control system according to an embodiment of the presently disclosed subject matter.

Specifically, for instance, as shown in FIGS. 1a through 4, a variable speed control system, generally designated 100 can comprise a handle 110 configured to be gripped by an operator to control the operation of a working machine, such as a lawnmower or other small powered machine, to which handle 110 is connected. A control system base 120 can be attached to or otherwise positioned near handle 110, and a control lever 130 can be movably attached to control system base 120. With this general configuration, control lever generally designated 130 can be moved to control operation of a machine component, such as for example a variable transmission for a self-propel system of the working machine.

In particular, control lever 130 can comprise a lever arm 132 having a first end that is pivotably attached to control system base 120 (e.g., about a pivot axis 133) and a second end substantially opposing the first end that comprises a grip portion 134. Specifically, for example, as shown in FIGS. 1a, 2a, 3a, and 4, control lever 130 can have a substantially L-shaped profile, with grip portion 134 extending at a non-zero angle (e.g., between about 50 and 90 degrees) away from lever arm 132. This angular arrangement allows the operator to grab grip portion 134 in a comfortable hand position and pivot control lever 130 with respect to control system base 120.

In this regard, to control the operation of the associated machine component (e.g., a self-propel system), control lever 130 can be selectively pivoted with respect to control system base 120 between a first angular position (See, e.g., FIGS. 1a and 1b) at which grip portion 134 of control lever 130 is spaced apart from handle 110 and a second angular position (See, e.g., FIGS. 2a and 2b) at which at least a portion of grip portion 134 is positioned within a recess 112 that is formed in an edge of handle 110. For example, this movement of control lever 130 between the first and second angular position can involve pivoting the control lever through a limited angular range (e.g., about 35 degrees) such that the movement of control lever 130 can be comfortably performed by the operator without letting go of handle 110. In other words, while the operator is holding handle 110 to steer or otherwise control the working machine, the operator can extend his/her thumbs backwards a short distance (e.g., about 71 mm) to grab grip section 134 while keeping his/her other fingers on handle 110. As a result, variable speed control system 100 can be easily manipulated while the operator maintains overall control of the working machine.

With respect to the particular positioning of control lever 130 during operation of variable speed control system 100, recess 112 can be designed to be large enough such that grip portion 134 can be nested substantially entirely within recess 112. In this way, pivoting control lever 130 to the second angular position can involve pivoting control lever 130 into a position in which an outer surface 135 of grip portion 134 of control lever 130 is substantially flush with an outer surface generally designated 115 of handle 110. In this way, the combination of handle 110 and grip portion 134 can fit together such that the operator can comfortably hold control lever 130 in a substantially fixed manner at the second angular position by squeezing grip portion 134 into recess 112.

This movement of control lever 130 among the various angular positions discussed above can be used to control the operation of the associated machine component by connecting a control connector 122 between control lever 130 and the machine component. Specifically, for example, control connector 122 can be a Bowden-type cable in which an inner wire is movable with respect to a hollow outer cable housing to transmit a force to the machine component. In one particular arrangement shown in FIG. 4, for example, control lever 130 can be connected to a pivot shaft 123 (e.g., a central longitudinal axis of which acts as pivot axis 133) that is pivotable within control system base 120. Pivot shaft 123 can further be connected to control connector 122 such that pivoting movement of control lever 130 can cause rotation of pivot shaft 123 within control system base 120, which in turn can cause translation of the inner wire of control connector 122. In addition, at least a portion of control connector 122 can be contained within (e.g., routed through) control system base 120 and/or handle 110 to prevent inadvertent actuation of control connector 122. In this way, the pivoting movement of control lever 130 can be translated into changes in the operating state of the connected machine component. Those having skill in the art will recognize that any of a variety of other configurations for control connector 122 can be used to translate movement of control lever 130 into changes in the operation of the connected machine component. For example, control connector 122 can be a wired or wireless electrical signal transmitter that enables communication between control lever 130 and the machine component.

Regardless of its particular arrangement, control connector 122 can be configured to control the machine component to be in a first operating state when control lever 130 is in the first angular position. For instance, where the machine component is a self-propel system for a working machine, the first operating state can be a disengaged state (i.e., no torque applied). Upon movement of control lever 130 to the second angular position, however, control connector 122 can be configured to control the machine component to be in a second operating state. Again, for instance, where the machine component is a self-propel system for a working machine, the second operating state can be a fully engaged or high speed state (i.e., torque applied to the drive system such that the working machine is moved at a predetermined cruising speed).

As discussed above, the combination of handle 110 and grip portion 134 can fit together such that the operator can comfortably hold control lever 130 in a substantially fixed manner at the second angular position. With respect to the operation of a self-propel system, this ability to comfortably maintain control lever 130 in the second angular position means that the operator can maintain the working machine at a cruising speed by simply gripping around the nested combination of handle 110 and grip portion 134.

In addition, recess 112 can be configured such that it is large enough that grip portion 134 can be depressed beyond the point at which outer surface 135 of grip portion 134 is aligned substantially flush with outer surface 115 of handle 110. In this regard, control lever 130 can be further selectively pivotable to a third angular position at which outer surface 135 of grip portion 134 of control lever 130 is depressed into recess 112 of handle 110. With control lever 130 in this third angular position, control connector 122 can be configured to control the machine component to be in a third operating state. For instance, the third operating state can comprise an over-stroke state of the machine component that provides additional torque to the self-propel system to account for changing ground conditions (e.g., inclines, uneven ground surfaces). In this way, from the second angular position, if the operator desires to apply additional driving torque (e.g., to travel up a hill), grip portion 134 can be depressed into recess 112 (e.g., by using his/her thumbs to press grip portion 134 further into handle 110) to the third angular position. Depending on the configuration of recess 112, this additional over-stroke travel from the second angular position to the third angular position can be small compared to the angle of travel between the first angular position and the second angular position. To limit the extent of this over stroke, handle 110 can be configured to define or include a stop 116 at the back of recess 112 such that once a leading edge 136 of grip portion 134 encounters stop 116, control lever 130 is prevented from pivoting any farther.

Furthermore, those having skill in the art will recognize that control lever 130 can additionally be pivoted to any of a variety of intermediate angular positions to correspondingly operate the machine component in one or more partial engagement states (e.g., low- to medium-speed operating states of the self-propel system). In this way, the operator can selectively operate the machine component at states between the first and second operating states.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A variable speed control system for a walk-behind working machine, comprising:
    a control system base;
    a handle having a recess disposed in an edge of the handle;
    a control lever comprising a lever arm having a first end that is pivotably attached to the control system base and a second end substantially opposing the first end that comprises a grip portion, the control lever being selectively pivotable with respect to the control system base between a first angular position at which the grip portion of the control lever is spaced apart from the handle and a second angular position at which at least a portion of the grip portion is positioned within the recess of the handle; and
    a control connector in communication between the control lever and a machine component, wherein the control connector is configured to control the machine component to be in a first operating state when the control lever is in the first angular position, and wherein the control connector is configured to control the machine component to be in a second operating state when the control lever is in the second angular position.

2. The variable speed control system of claim 1, wherein the handle is attached to the control system base.

3. The variable speed control system of claim 1, wherein the control connector comprises a control cable connected between the control lever and a machine component.

4. The variable speed control system of claim 3, wherein at least a portion of the control cable is contained within the control system base.

5. The variable speed control system of claim 1, wherein the control lever is pivotable at least about 35 degrees between the first angular position and the second angular position.

6. The variable speed control system of claim 1, wherein the first operating state comprises a disengaged state of the machine component; and
    wherein the second operating state comprises an engaged state of the machine component.

7. The variable speed control system of claim 1, wherein the machine component comprises a variable transmission for a self-propel system of the working machine; and
    wherein the engaged state comprises operation of the self-propel system at a predetermined cruising speed.

8. The variable speed control system of claim 1, wherein an outer surface of the grip portion of the control lever is substantially flush with an outer surface of the handle when the control lever is in the second position.

9. The variable speed control system of claim 8, wherein the control lever is selectively pivotable to a third angular position at which the outer surface of the grip portion of the control lever is depressed into the recess of the handle, wherein the control connector is configured to control the machine component to be in a third operating state when the control lever is in the third angular position.

10. The variable speed control system of claim 9, wherein the third operating state comprises an over-stroke state of the machine component.

11. A variable speed control system for a walk-behind working machine comprising:
    a control system base;
    a handle having a recess formed in an edge of the handle;
    a control lever comprising a lever arm having a first end that is pivotably attached to the control system base and a second end substantially opposing the first end that comprises a grip portion, the control lever being selectively pivotable with respect to the control system base among a first angular position at which the grip portion of the control lever is spaced apart from the handle and a second angular position at which an outer surface of the grip portion of the control lever is substantially flush with an outer surface of the handle; and
    a control cable connected between the control lever and a machine component, wherein the control cable is configured to control the machine component to be in a relatively low-speed operating state when the control lever is in the first angular position, and wherein the control cable is configured to control the machine component to be in a relatively high-speed operating state when the control lever is in the second angular position.

12. The variable speed control system of claim 11, wherein the control lever is selectively pivotable to a third angular position at which the outer surface of the grip portion of the control lever is depressed into the recess of the handle, wherein the control cable is configured to control the machine component to be in an over-stroke operating state when the control lever is in the third angular position.

13. A method for varying a speed of a walk-behind working machine, the method comprising:
    pivoting a control lever with respect to a control system base to any of a variety of angular positions, including a first angular position at which a grip portion of the control lever is spaced apart from a handle, a second angular position at which at least a portion of the grip portion is positioned within a recess disposed in an edge of the handle, and a third angular position at which the outer surface of the grip portion of the control lever is depressed into the recess of the handle;
    wherein pivoting the control lever to the first angular position controls a machine component to be in a first operating state;
    wherein pivoting the control lever to the second angular position controls a machine component to be in a second operating state; and wherein pivoting the control lever to the third angular position controls a machine component to be in a third operating state.

14. The method of claim 13, wherein pivoting the control lever to control the machine component comprises actuating a control connector in communication between the control lever and a machine component.

15. The method of claim 13, wherein pivoting the control lever between the first angular position and the second angular position comprises pivoting the control lever at least about 35 degrees.

16. The method of claim 13, wherein the first operating state comprises a disengaged state of the machine component; and wherein the second operating state comprises an engaged state of the machine component.

17. The method of claim 16, wherein the machine component comprises a variable transmission for a self-propel system of the working machine; and wherein the engaged state comprises operation of the self-propel system at a predetermined cruising speed.

18. The method of claim 13, wherein pivoting the control lever to the second angular position comprises pivoting the control lever to a position at which an outer surface of the grip portion of the control lever is substantially flush with an outer surface of the handle when the control lever is in the second position.

19. The method of claim 13, wherein the third operating state comprises an over-stroke state of the machine component.

\* \* \* \* \*